United States Patent
Aeschlimann et al.

(10) Patent No.: US 9,205,632 B2
(45) Date of Patent: Dec. 8, 2015

(54) METHOD AND DEVICE FOR FASTENING AN ITEM TO AN OBJECT SURFACE MADE OF A POROUS OR FIBROUS MATERIAL

(75) Inventors: Marcel Aeschlimann, Ligerz (CH); Mario Lehmann, Les Pommerats (CH); Laurent Torriani, Lamboing (CH)

(73) Assignee: WOODWELDING AG, Stansstad (CH)

( * ) Notice: Subject to any disclaimer, the term of this patent is extended or adjusted under 35 U.S.C. 154(b) by 0 days.

(21) Appl. No.: 13/807,030

(22) PCT Filed: Jul. 4, 2011

(86) PCT No.: PCT/CH2011/000157
§ 371 (c)(1),
(2), (4) Date: Feb. 18, 2013

(87) PCT Pub. No.: WO2012/003595
PCT Pub. Date: Jan. 12, 2012

(65) Prior Publication Data
US 2013/0139956 A1    Jun. 6, 2013

(30) Foreign Application Priority Data
Jul. 5, 2010    (CH) .................................... 1086/10

(51) Int. Cl.
*B32B 37/06* (2006.01)
*G06K 19/077* (2006.01)
(Continued)

(52) U.S. Cl.
CPC ............. *B32B 37/06* (2013.01); *B32B 38/0004* (2013.01); *G06K 19/077* (2013.01);
(Continued)

(58) Field of Classification Search
CPC .... B32B 37/0076; B32B 37/04; B32B 37/06; B32B 38/04; B32B 38/0004; B32B 2038/042; B29C 65/74443; Y10T 156/12; Y10T 156/1309; Y10T 156/1313; Y10T 156/1326; Y10T 156/1339; G06K 19/077; G06K 19/07749; G06K 19/07758

USPC .............. 156/73.3, 73.5, 73.6, 213, 250, 251, 156/261, 267, 269, 290, 292, 306.6, 308.4, 156/309.6, 357, 517, 521, 73.1–73.4, 256, 156/262, 515, 530, 580.1, 580.2, 156/DIG. 19–DIG. 21
See application file for complete search history.

(56) References Cited

U.S. PATENT DOCUMENTS 3,520,751 A  *  7/1970  Cranfill ........................... 156/220
3,730,814 A  *  5/1973  Kuroda ........................... 156/515
(Continued)

FOREIGN PATENT DOCUMENTS

| JP | 59-225917 | 12/1984 |
| WO | 2006/119279 | 11/2006 |

OTHER PUBLICATIONS http://en.wikipedia.org/wiki/Hot-melt_adhesive; May 11, 2010.*

*Primary Examiner* — Yogendra Gupta
*Assistant Examiner* — Hannuri L Kwon
(74) *Attorney, Agent, or Firm* — Rankin, Hill & Clark LLP

(57) ABSTRACT

Objects are fastened to object surfaces of a porous or fibrous material, in particular made of wood or a wood-like material, with the aid of a thermoplastic fastening film. For this, the object, which is separate from, or integrated in the fastening film, is positioned on the object surface and, with the aid of a vibrating fastening tool having a distally arranged, for example closed, perimetric profile element, which is positioned on the fastening film, is anchored in the object surface along a perimeter, and optionally also punched out. The fastening is suitable in particular for fastening identification carriers to wooden objects such as pallets or tree trunks, wherein the identification carriers are equipped, for example, with an antenna and an RFID chip or with a bar code.

15 Claims, 2 Drawing Sheets

(51) Int. Cl.
  *B32B 38/00* (2006.01)
  *B29C 65/74* (2006.01)
  *B32B 38/04* (2006.01)
  *B29C 65/08* (2006.01)
  *B32B 37/00* (2006.01)
  *B32B 37/04* (2006.01)

(52) U.S. Cl.
  CPC ............ *B29C 65/08* (2013.01); *B29C 65/7443* (2013.01); *B32B 37/0076* (2013.01); *B32B 37/04* (2013.01); *B32B 38/04* (2013.01); *B32B 2038/042* (2013.01); *Y10T 156/12* (2015.01); *Y10T 156/1309* (2015.01); *Y10T 156/1313* (2015.01); *Y10T 156/1326* (2015.01)

(56) References Cited

U.S. PATENT DOCUMENTS

| | | | | |
|---|---|---|---|---|
| 5,252,167 | A | * | 10/1993 | Hoppe et al. .................. 156/261 |
| 5,431,763 | A | * | 7/1995 | Bradshaw ..................... 156/256 |
| 5,867,102 | A | * | 2/1999 | Souder et al. ............. 340/572.8 |
| 6,818,863 | B1 | * | 11/2004 | Tang et al. .................... 219/243 |
| 2002/0078506 | A1 | * | 6/2002 | Sloot ................................ 5/644 |
| 2007/0065592 | A1 | * | 3/2007 | Han et al. ................... 427/398.1 |

* cited by examiner

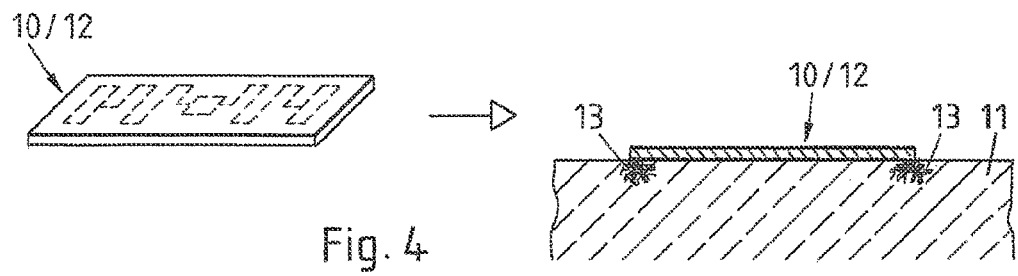
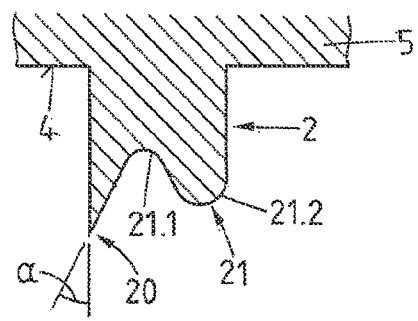
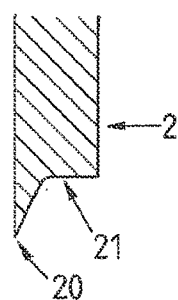
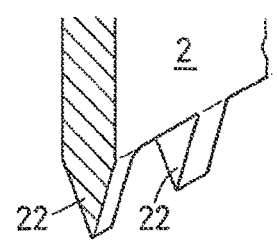
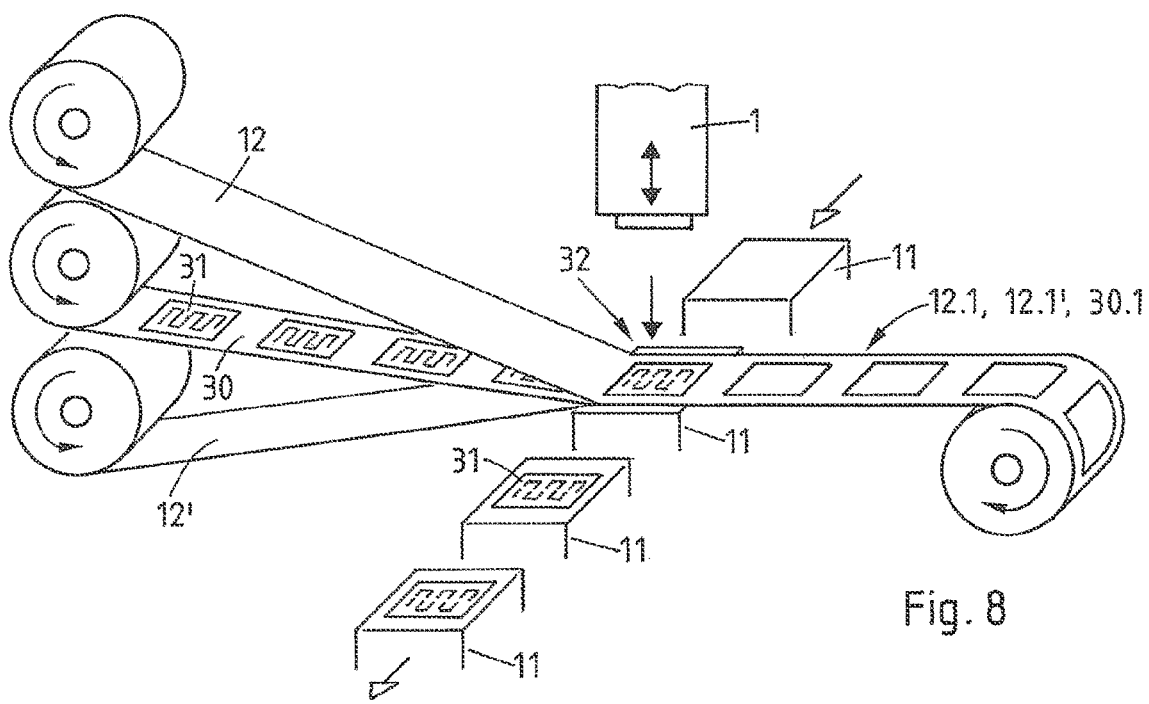

METHOD AND DEVICE FOR FASTENING AN ITEM TO AN OBJECT SURFACE MADE OF A POROUS OR FIBROUS MATERIAL

BACKGROUND OF THE INVENTION

1. Field of the Invention

The invention relates to a method and to a device for fastening an object on an object surface of a porous or fibrous material, wherein the object is essentially flat and in particular is equipped as an identification carrier (e.g. RFID tag or tag with an optically readable identification marking) and wherein at least that object surface, on which the object is to be fastened, consists of porous or fibrous material, in particular of wood or of a material which has wood-like characteristics and is possibly manufactured from wood (e.g. chipboard, plywood, cardboard).

2. Description of Related Art

It is known, for example, to provide wooden pallets or tree trunks with identification platelets of metal or plastic for example, wherein the identification platelets comprise an integrated RFID chip with an antenna or a printed-on barcode. Such identification platelets are fastened, for example, with the help of nails, screws or clips, on the wooden surface, wherein for fastening, they comprise openings as the case may be, or the platelets themselves are provided with a plurality of nail-like leglets, which are knocked into the wood. Such identification platelets and methods for their fastening are described, for example, in the publications FR-2610749 or FR-2832841. A further method for fastening an identification means on an object of wood is described in the publication FR-2928350. In this method, a cavity is provided in the object, the identification carrier is positioned in the cavity, and the cavity is then cast out with a liquefied, thermoplastic plastic.

It is also known from the publication WO 2006/119279, to apply chips to packaging or packaging material of cardboard, for identification purposes, wherein the chips are mounted on an adhesive tape which, for example, also serves for strengthening the packaging and is provided with an adhesive which can be activated by pressure and heat as the case may be. For application of the adhesive tape, this is pressed on to the packaging or the packaging material with the help of a roll which is likewise heated as the case may be. The precondition for this is that the chips are flexible and heat-resistant (page 6).

BRIEF SUMMARY OF INVENTION

It is then the object of the present invention, to provide a further method and a further device, which serve for fastening an essentially flat object (in particular identification carrier) on an object of a porous or fibrous material, in particular of wood or a wood-like material, wherein the method according to the invention should be able to be carried out without the object and in particular the identification means, being subjected to the risk of damage, and wherein the object, with the object fastened according to the method according to the invention, should be suitable in particular for handling without any particular precaution and also in hostile weather conditions. Moreover, the method according to the invention should be simple to carry out, in particular without special preparation of the object surface and with simple aids and, for example, should also be applicable to identification carriers which are common on the market, for example in the form of identification tags.

This object is achieved by the method and the device as are defined in the independent claims.

The method according to the invention is based on an anchoring of a thermoplastic material in a porous, fibrous or other suitably structured object surface, by way of pressing the thermoplastic material onto this surface and the local melting-on of the thermoplastic material, in particular where it is pressed against the object surface, and in a manner such that the liquefied material by way of the pressing pressure is pressed into the porous or fibrous structure of the object surface, where, when it solidifies again, it forms a positive-fit and, as the case may be, additionally material-fit anchoring in this surface. The thermoplastic material is preferably subjected to a mechanical vibration (e.g. ultrasound) for the liquefaction of this. The principle of such methods is described, for example, in the publications WO 96/01377 and WO 98/42988. However, for the liquefaction of the thermoplastic material, it is also possible to heat the fastening tool used in the pressing in a targeted manner (electrically or by absorption of electromagnetic waves, in particular laser light), or by the production of eddy currents, for which the thermoplastic is to be provided with a suitable filler.

With the method according to the invention, a fastening film is applied, which at least in an edge region comprises a thermoplastic which can be liquefied in particular by way of mechanical vibration (e.g. ultrasound), wherein the fastening film in the context of a simple aid advantageously has a constant thickness, so that it can be processed for example from a roll. The fastening film can thereby either itself be the object to be fastened (object integrated in the fastening film), i.e. it for example itself is an identification carrier, and as identification means comprises a printed-on or differently attached bar code or another suitable marking, or it is provided with a combination of a printed-on antenna and RFID chip (e.g. deposited on a film surface or enclosed between two laminated film parts). On the other hand, the fastening film can also be neutral and serve for fastening a separate object, for example a separate identification carrier.

The fastening film mentioned above is positioned on the porous or fibrous object surface. Thereby, a marking (e.g. identification means) which is arranged on one film side (e.g. printed or glued on) is directed towards the object surface, or a separate object (e.g. identification carrier) is positioned between the fastening film and the object surface or between two fastening films. The fastening film(s) is then pressed locally against the object surface and at least partly liquefied, with the help of a fastening tool designed for pressing the fastening film and for the supply of liquefaction energy, wherein the fastening tool for example is a vibrating tool (e.g. sonotrode of an ultrasound apparatus). The pressing and liquefaction is thereby limited locally to a linear region which at least partly extends around the object to be fastened. For this, the fastening tool at its distal end has a profile which is for example closed and which extends linearly at least partly around a central region, wherein the profile and the central region are designed in a manner such that only the profile is in contact with the fastening film during the application of pressure and vibration on the fastening film. The shape of the profile which, for example, is closed or of the central region outlined by the profile, is adapted to the shape of the object to be fastened or to the marking deposited on the fastening film, in a manner such that the tool profile is positionable around the object or marking, wherein the fastening film is to reach up to the outer edge of the profile at least at locations, advantageously everywhere.

By way of the supply of the liquefaction energy, e.g. in the form of vibration, the fastening film in the region of the tool profile, thus at least partly around a separate object or marking deposited on the fastening film, is pressed against the object surface, by which means the thermoplastic material is at least partly liquefied in this (edge) region and pressed into the object surface, whilst the fastening film in the central region, in which the object or the marking of the fastening film is positioned, is neither subjected to the influence of the pressing pressure nor the influence of the liquefaction energy and remains unchanged, in particular is not damaged by way of this.

Preferably, the profile of the fastening tool as an outermost (distance furthest to the central region) element comprises a cutting edge or cutting teeth arranged in a row, and a pressing region which is perimetric within the cutting edge or row of cutting teeth and has a pressing surface, wherein the cutting edge or cutting teeth distally project beyond the pressing surface and in particular serve for separating or at least perforating the fastening film, whereas the pressing surface, in particular, serves for anchoring the fastening film in the object surface. Depending on the material of the object surface and depending on the demands on the fastening of the fastening film on this surface, a tool profile which only has one cutting edge or cutting teeth can also be sufficient, wherein then it is particularly the inner flank of the cutting edge or cutting teeth which serves as a pressing surface. A tool profile with a cutting edge or with cutting teeth arranged adequately densely next to one another permits the processing of fastening films of any shape and size, without film parts outside the anchoring line or outside the tool profile, after the fastening, adhering on the object surface on one side in a manner projecting beyond this, where they could represent undesirable vulnerable points for a destruction of the fastening. Moreover, the tool profile with a cutting edge or suitably arranged cutting teeth permits a processing from quasi endless film tapes from the roll, without further device parts having to be provided for this, for separating discrete pieces of film from the roll. Where appropriate, it could be advantageous to feed such film tapes to the fastening process in a pre-perforated form, for simplifying the separating-away. A tool profile without a cutting edge can also be used for the processing of pre-shaped film pieces with a tool, whose profile is adapted more or less accurately to the film pieces.

An identification means which is fastened on the object according to the method according to the invention, be it on or in the fastening film itself or arranged on or in a separate carrier, at least on the one side is not only well fastened by the fastening film and by way of its anchoring in the material of the object surface, but is also well projected from external influences if the fastening runs completely around the identification means, since the anchoring not only represents a mechanical fastening but also a hermetic seal between the object surface and the fastening film, as well as, as the case may be, between two fastening films arranged above one another.

Of course, the method according to the invention not only permits the fastening of identification carriers on object surfaces of porous or fibrous materials, but also an equal fastening of other, essentially flat objects which are either the fastening film itself or separate objects which are fastened on the object surface by way of the fastening film. Such other objects are for example tags with functions other than for identification (e.g. price tags, type tags with optical or electronic data, package leaflets or other package objects, such as CDs for example) wherein such objects can also be fastened on the outer side of packaging, for example of wood-chip or uncoated cardboard.

Article surfaces which are likewise suitable for the method according to the invention consist for example of brick, foam brick, metal foam or of ceramic foams (e.g. glass, insulation material, melt filters).

The device according to the invention, in particular, comprises the fastening tool which on its distal face surface has the profile already described further above and which in a way and manner known per se, is equipped for feeding liquefaction energy to this profile and for the coupling to an energy source. Fastening tools with suitably adapted profiles are to be provided for different shapes of objects to be fastened and for object surfaces with different characteristics. The proximal tool end is equipped, for example in a manner known per se, for coupling to a vibration source (e.g. ultrasound generator, if applicable with a booster), wherein the tool and the coupling means are to be equipped for a transmission of the vibration to the distal tool end, thus into the tool profile, with as little loss as possible.

The device according to the invention can include an energy source (e.g. vibration source), in particular if the tool or a part thereof is connected to this source in a fixed manner. Moreover, the device can comprise means for feeding a quasi continuous film material and, where appropriate, means for conveying away detached film material.

A kit for carrying out the method according to the invention in particular comprises a fastening tool and fastening film, wherein dimensions of the fastening film are adapted to dimensions of the tool profile. Moreover, the kit can comprise an energy source (e.g. vibration source) and a plurality of fastening tools with different tool profiles, wherein all fastening tools of such a kit have equally designed proximal ends.

Essentially, all thermoplastic plastic films, in particular films of ABS, PVC or Xyrocoll for example, are suitable for the method according to the invention, wherein the fastening films is advantageously not thinner than about 0.8 mm and, in particular if it is also separated by the method, not thicker than 3 to 4 mm, wherein the fastening tool is to be designed in a manner such that the profile projects beyond a central region by way least the thickness of the fastening film to be processed. In particular, a flexible and, as the case may be, somewhat elastic fastening film or a film which is thermally pre-shaped transversely to its two-dimensional extension, is suitable for the fastening of an object separate from the fastening film.

The advantages of the method according to the invention compared to the known fastening methods for the fastening of identification carriers on objects of a porous or fibrous material such as wood or wood-like materials for example, lie in the fact that the resulting fastening, in particular when it runs completely around the fastened object, also represents an all-round sealing with regard to moisture and other environmental influences, and that a container which is hermetically sealed with respect to the object also results with the embodiment with two fastening films and an identification means arranged therebetween. A further advantage lies in the fact that particularly with the embodiment, with which the fastening film is not only anchored in the object surface, but also separated, the fastening relates to the outermost edge of the fastened film piece, so that no vulnerable points arise, which can be caught between the fastening film and the object surface, which would simplify a destruction of the fastening. It may also be an advantage of the method according to the invention that an object fastened with a separate fastening film is only connected to the fastening film in an edge region or even not at all, which is to say, the two elements are not connected to one another by way of lamination.

BRIEF DESCRIPTION OF THE DRAWINGS

The method and device according to the invention are described in more detail by way of the following figures. There are shown in:

FIG. 4 the fastening of an identification carrier which also serves as a fastening film, with the help of the tool according to FIG. 1;

FIGS. 5 to 7 exemplary embodiments of the tool profile;

FIG. 8 a schematic diagram of a device for the continuous implementation of the method according to FIG. 2.

DETAILED DESCRIPTION OF THE INVENTION

Figure 1:
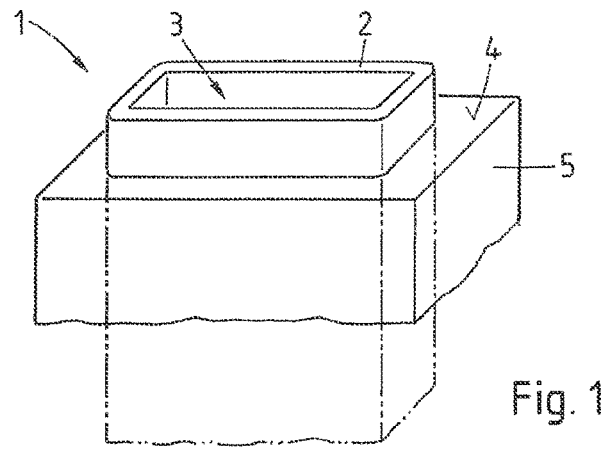
FIG. 1 an exemplary tool for carrying out the method according to the invention.

FIG. 1 shows the distal end of a fastening tool 1 which is suitable for carrying out the method according to the invention. The tool 1 as a distal region (directed to the top in FIG. 1) comprises a profile 2 which is perimetrically closed and encloses a central region 3 all around. The profile 2 is arranged, for example, on a distal surface 4 of a tool base 5, wherein the distal surface 4 can not only have a central region within the profile 2, but also a perimetric region outside the profile 2, and wherein the profile 2 must project by at least the thickness of a fastening film to be processed, beyond the distal base surface. As is indicated in a dot-dashed manner, the tool can however also be tubular, which is to say be designed essentially without a tool base 5.

The tool profile, as is shown in FIG. 1 can run around the central region in an uninterrupted manner, but it can however also be interrupted in a regular or irregular manner or it can extend in another manner only partly around this central region.

Usually, the central surface defined by the tool profile as well as the distal base surface 4 would be plane or level. This however is not a precondition of the method according to the invention, since at least the inner surface defined by the tool profile is to be adapted to a curvature of the object surface, for the fastening of an object onto a non-plane object surface.

The tool 1 consists of metal, for example of stainless steel.

Figure 2:
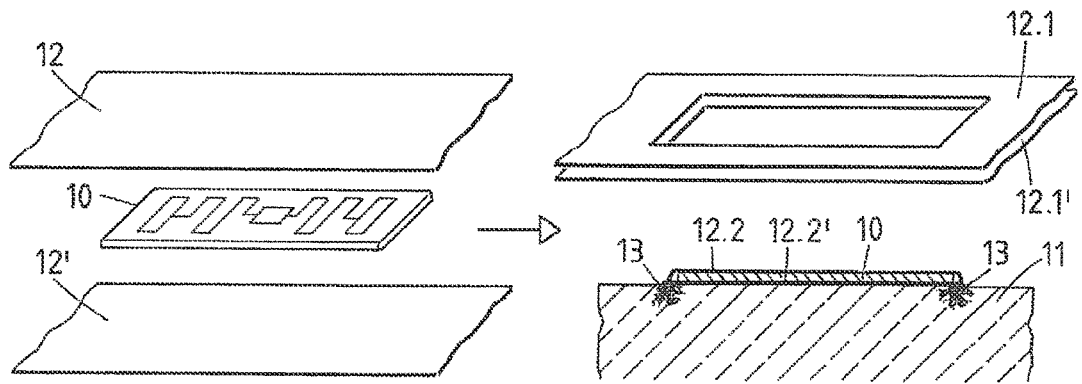
FIG. 2 the fastening of a separate identification carrier with the help of the tool according to FIG. 1 and two fastening films.

FIG. 2 illustrates an exemplary embodiment of the method according to the invention, according to which a separate object, e.g. an identification carrier 10 with an antenna and RFID chip and in the form of a flat platelet, is fastened on an object 11. The figure on the left shows the identification carrier 10 and two fastening films 12 and 12' which are used for its fastening, wherein the identification carrier 10 is arranged for the fastening between the two fastening films 12 and 12' and wherein the two fastening films, as represented, are preferably parts of film tapes and are fed from the roll, but can also be discrete film pieces. To the right in FIG. 2, the object 11 is represented with the identification carrier 10 fastened thereon and film remains 12.1, 12.1' from which the film regions 12.2 and 12.2' used for the fastening of the identification carrier 10 are punched out. The two film pieces 12.2 and 12.2' are anchored around the identification carrier 10, in the object surface (anchoring line 13) and are connected to one another, so that together they form a hermetic container for the identification carrier 10.

The two fastening films 12 and 12' which are used in the method according to FIG. 2 can have the same or different thermoplastics or consist of these, wherein different thermoplastics are to be selected in a manner such that they can be welded to one another. Films which have the thermoplastic only in one region, in which they are to be anchored in the object surface, which is to say in a region, in which the tool profile is to act on them, can also be applied. It is also possible to modify the method represented in FIG. 2 to the extent that the identification carrier 10 is not applied as a discrete object, but likewise as a tape-like composite of a plurality of identification carriers, wherein regions then are not only punched out of the fastening films by way of the tool profile, but also out of the tape-like composite (see FIG. 8 and corresponding description).

Figure 3:
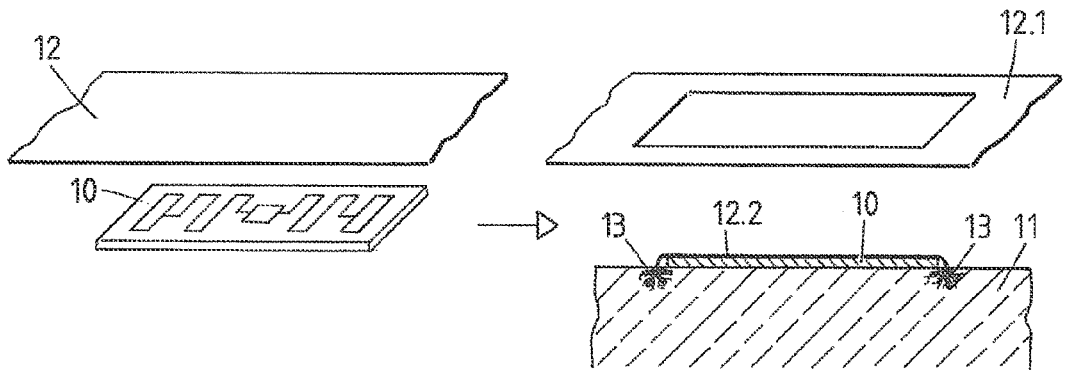
FIG. 3 the fastening of a separate identification carrier with the help of the tool according to FIG. 1 and one fastening film.

In the same manner of representation as FIG. 2, FIGS. 3 and 4 show further embodiments of the method according to the invention, wherein according to FIG. 3, only one fastening film 12 is applied and the (separate) identification carrier 10 is positioned between the object surface and the fastening film 12 and wherein according to FIG. 4, the identification carrier itself represents the fastening film (10/12), thus no separate fastening film is used. In the method according to FIG. 3, a superficial marking of the identification carrier is advantageously directed away from the object surface, in the method according to FIG. 4 advantageously towards the object surface.

All method variants and advantageous designs, which are described in the context of FIG. 2, may also be applied to the method according to FIGS. 3 and 4 when adapted in a suitable manner.

The methods according to FIGS. 2 and 3 are, in particular, suitable for the processing of film tapes with printed-on markings or antenna, in combination with assembled-on, integrated circuits, as are manufactured in the known manner for the most varied of applications, wherein the films are very thin (e.g. 0.1 to 0.2 mm) and can neither give the identification means adequate protection, nor have sufficient thermoplastic material for a satisfactory anchoring in the object surface. These functions are then advantageously assumed by the separate fastening film, which is advantageously 0.8 to 4 mm thick.

FIGS. 5 to 7 show different tool profiles 2 which are suitable for the method according to the invention, in cross section, wherein the distal end is directed to the bottom and wherein the profile 2 is represented in each case with a central region arranged to the right of this and a perimetric region arranged to the left thereof.

The tool profile according to FIG. 5 projects beyond a tool base 5 and on its outer side comprises a cutting edge 20 and within the cutting edge and connecting directly to this a pressing surface 21, wherein the pressing surface comprises a convex region 21.1 connecting to the cutting edge and a concave region 21.2 connecting to the convex region. The cutting edge 20 has a cutting angle $\alpha$ of advantageously less than 60°, advantageously 20 to 40°, and projects beyond the pressing surface 21 by at least 0.5 mm. The distance between the distal base surface 4 and the cutting edge 20 is greater than the thickness of the film to be processed or the sum of the thicknesses of the film to be processed, by at least 0.5 mm. The total width of the pressing surface 21 is, for example, 2 mm.

An anchoring of a fastening film, which is created with the tool profile according to FIG. 5, is pronounced in the region of the pressing surface 21 (in particular in the region of the convex region of the pressing surface) and less pronounced in the region of the inner surface of the cutting edge 20, wherein the cutting edge 20 can leave behind a macroscopic groove in the object surface and wherein the fastening film is severed in this region in a clean manner.

The tool profile 2 according to FIG. 6, as is the case with the tool profile 2 according to FIG. 5, comprises a cutting edge 20 and a pressing surface 21 arranged within the cutting edge 20, wherein the pressing surface is essentially plane.

FIG. 7 shows a tool profile 2 which instead of a cutting edge comprises a row of cutting teeth 22 and no separate pressing surface, with which the flanks of the cutting teeth 22 thus act as pressing surfaces. Depending on the distance between the cutting teeth 22, these act like a cutting edge as a separating means for severing the fastening film. With a greater distance between the cutting teeth 22, these manage merely to perforate the fastening film, which nevertheless can lead to a complete detachment of the fastening film by way of a subsequent force action. In any case, the film is anchored in the object surface in the region of the flanks of the cutting teeth 22, providing that the tool profile, the object surface and the pressing force are matched to one another in a manner such that the cutting teeth are pressed into the object surface material with the help of the pressing force. Thereby, less anchorage is to be expected in the region of a steeper flank than in the region of a less steep flank, which of course also applies to the flanks of a cutting edge. Blunter cutting edges or cutting teeth can also be used, where appropriate, in order to only anchor a corresponding fastening film without a separation or perforation.

FIG. 8 in a very schematic manner shows a device for carrying out the method according to the invention, wherein in the method, similarly to that shown in FIG. 2, two tapes of fastening films 12 and 12' and a film tape 30 with discrete identification means 31 arranged thereon, are fed for example from the roll in an intermittent manner to a processing location 32. The objects 11 are likewise fed to the processing location 32, for example transversely to the feed direction of the film tapes, wherein the feed of the film tapes 12, 12' and 30 and of the objects 11 is synchronised to an alternating movement of the tool 1, in a manner such that an identification means 31 is positioned between two regions of fastening films 12 and 12' on an object 11 and fastened with the tool 1, in each cycle. The objects 11 provided with identification means 31 and the punched-out film webs 12.1, 12.1' and 30.1 are led away from the processing location 32.

EXAMPLE

Fastening films of ABS, PVC or Xycrocoll with thicknesses of 1 mm, 1.2 mm or 2×1.2 mm were fastened with a tool profile as represented in FIG. 5, on solid spruce wood (face side) or chipboard, as is applied for pallet blocks, and punched out. The perimetric length of the profile was approx. 300 mm and the complete profile width about 3 mm. An ultrasound apparatus of the company Telsonic (Type UPS 3000, frequency 20 kHz, power 4 kW, booster 1:2, axial amplitude at the distal tool end approx. 60 μm) was used for the fastening, wherein the fastening process was path-controlled. A pre-load of 200 to 300 N (about 1 N per mm profile length) was applied for a secure positioning of the films between the object and the fastening tool. A pressing force of 1300 to 1800 N (about 6 N per mm profile length) was then increased and the vibration simultaneously started. The vibration was stopped given an advance of the tool which was only slightly larger than the thickness of the fastening films, but certainly smaller than the projection of the tool profile beyond the distal surface of the tool base. The pressing force was still maintained over a short time after terminating the vibration, before the tool was removed from the object. The complete fastening procedure was completed in 1 to 5 sec.

It has been found that the preload and the pressing force are not only to be matched to the profile length and the profile width, but also to the hardness of the object surface and the thickness and melting characteristics of the fastening film.

The invention claimed is:

1. A method for fastening an identification carrier on an object surface of a porous or fibrous material with the help of a liquefiable thermoplastic and a fastening tool, comprising the steps of:
    providing a fastening film that includes a liquefiable thermoplastic,
    providing an identification carrier to be fastened that is separate from the fastening film or is integrated into the fastening film,
    providing a fastening tool that has a distal profile that runs linearly in a manner adapted to the identification carrier or to the fastening film, and is designed for feeding energy suitable for the local liquefaction of the thermoplastic, to said distal profile,
    positioning the fastening film and, as the case may be, the separate identification carrier on the object surface, wherein the object surface is a hard object surface, and wherein the distal profile of the fastening tool is positioned on the fastening film,
    pressing the distal profile against the object surface, and simultaneously subjecting the distal profile to the energy, until a sufficient quantity of the thermoplastic is liquefied by the distal profile and has penetrated into the material of the object surface, in order to anchor the fastening film in this surface;
    wherein the energy is mechanical vibration energy,
    wherein the distal profile extends linearly at least partly around a central region and the distal profile and the central region are designed in a manner such that only the distal profile is in contact with the fastening film during the application of pressure and mechanical vibration energy on the fastening film, and
    wherein the identification carrier is at least one of:
        an RFID chip; and,
        a printed optically readable code on a substrate.

2. The method according to claim 1, wherein the profile comprises a self-contained shape.

3. The method according to claim 1, wherein the profile projects distally beyond a distal surface of a tool base, or the tool is tubular and the profile forms the distal face side of the tubular tool.

4. The method according to claim 1, wherein the fastening film and, if applicable, also the identification carrier, is additionally separated along the distal profile by way of the distal profile of the tool.

5. The method according to claim 1, wherein the identification carrier to be fastened is separate from the fastening film and wherein the fastening film is positioned above the identification carrier, or the fastening film is positioned above and a further fastening film below the identification carrier.

6. The method according to claim 1, wherein the identification carrier is integrated in the fastening film.

7. The method according to claim 4, wherein the fastening film and/or optionally a plurality of separate objects in the form of film tapes is/are, in a sequence of a plurality of fastening steps, fastened on a plurality of objects and punched out.

8. The method according to claim 1, wherein the object surface is a surface of wood or a wood-like material or brick or foam brick or metal foam or ceramic foam.

9. The method according to claim 1, wherein the distal profile of the fastening tool comprises an outer cutting portion and an inner non-cutting pressing surface portion.

10. The method according to claim 9, wherein the cutting portion comprises a cutting edge.

11. The method according to claim 9, wherein the cutting portion comprises a row of cutting teeth.

12. The method according to claim 9, wherein the inner non-cutting pressing surface portion is at a distance from the outer cutting portion.

13. The method according to claim 1, comprising providing the fastening film on a roll, wherein the step of positioning the fastening film comprises positioning a first portion of the fastening film on a processing location, the method comprising the further step of advancing the fastening film to position a second portion of the fastening film on the processing location after the step of pressing and subjecting the distal profile to the energy.

14. A method for fastening an identification carrier on an object surface of a porous or fibrous material with the help of a liquefiable thermoplastic and a fastening tool, comprising the steps of:
   providing a fastening film that includes a liquefiable thermoplastic,
   providing an identification carrier to be fastened that is separate from the fastening film or is integrated into the fastening film,
   providing a fastening tool that has a distal profile that runs linearly in a manner adapted to the identification carrier or to the fastening film, and is designed for feeding energy suitable for the local liquefaction of the thermoplastic, to said distal profile,
   positioning the fastening film and, as the case may be, the separate identification carrier on the object surface, wherein the object surface is a hard object surface, and wherein the distal profile of the fastening tool is positioned on the fastening film,
   pressing the distal profile against the object surface, and simultaneously subjecting the distal profile to the energy, until a sufficient quantity of the thermoplastic is liquefied by the distal profile and has penetrated into the material of the object surface, in order to anchor the fastening film in this surface;
   wherein the energy is mechanical vibration energy, and
   wherein the distal profile extends linearly at least partly around a central region and the distal profile and the central region are designed in a manner such that only the distal profile is in contact with the fastening film during the application of pressure and mechanical vibration energy on the fastening film, and wherein the distal profile of the fastening tool comprises an outer cutting portion and an inner non-cutting pressing surface portion, and wherein the cutting portion comprises a row of cutting teeth.

15. The method according to claim 14, wherein the inner non-cutting pressing surface portion is at a distance from the outer portion.

* * * * *